US012560945B2

(12) United States Patent
Gagliano et al.

(10) Patent No.: US 12,560,945 B2
(45) Date of Patent: Feb. 24, 2026

(54) METHOD FOR REMOTE STOP OF A VEHICLE

(71) Applicant: Kodiak Robotics, Inc., Mountain View, CA (US)

(72) Inventors: Joseph Gagliano, Santa Clara, CA (US); Albert Norman Moser, Mountain View, CA (US); Alistair Marek Dobke, Mountain View, CA (US); Court Scott Hinricher, Pacifica, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 376 days.

(21) Appl. No.: 18/062,954

(22) Filed: Dec. 7, 2022

(65) Prior Publication Data

US 2024/0192679 A1 Jun. 13, 2024

(51) Int. Cl.
G05D 1/223 (2024.01)
B60W 10/06 (2006.01)
(Continued)

(52) U.S. Cl.
CPC ............. G05D 1/223 (2024.01); B60W 10/06 (2013.01); B60W 10/18 (2013.01);
(Continued)

(58) Field of Classification Search
CPC ...... G05D 1/0011; G05D 1/223; G05D 1/225; G05D 1/228; G05D 1/247; B60W 10/06;
(Continued)

(56) References Cited

U.S. PATENT DOCUMENTS 3,646,515 A * 2/1972 Vodehnal .............. B60R 25/102
455/99
4,845,463 A 7/1989 Didier
(Continued)

FOREIGN PATENT DOCUMENTS

WO WO-2022171480 A1 * 8/2022 ............ B60T 13/385

OTHER PUBLICATIONS

Notice of Allowance dated Jan. 7, 2025, directed to U.S. Appl. No. 18/062,942; 9 pages.
(Continued)

*Primary Examiner* — Russell Frejd
(74) *Attorney, Agent, or Firm* — Michele V. Frank; Venable LLP

(57) ABSTRACT

A method for remotely stopping a vehicle configured to operate autonomously or semi-autonomously. The method includes providing an electromechanical remote stop system, applying a control signal to the vehicle with the electromechanical remote stop system, and observing an errant behavior of the vehicle. The method includes actuating the electromechanical remote stop system after observing the errant behavior, ceasing applying the control signal based on actuating the electromechanical remote stop system, and applying a first braking force due to the ceasing applying the control signal. The method includes applying a second braking force due to the ceasing applying the control signal. Actuating the electromechanical remote stop system, and thus, applying the first braking force and the second braking force, occurs at a location exterior to the vehicle.

20 Claims, 5 Drawing Sheets

(51) Int. Cl.

| | |
|---|---|
| *B60W 10/18* | (2012.01) |
| *B60W 60/00* | (2020.01) |
| *G05D 1/225* | (2024.01) |
| *G05D 1/228* | (2024.01) |
| *G05D 1/247* | (2024.01) |

(52) U.S. Cl.

CPC ......... *B60W 60/0015* (2020.02); *G05D 1/225* (2024.01); *G05D 1/228* (2024.01); *G05D 1/247* (2024.01); *B60W 2556/45* (2020.02); *B60W 2710/06* (2013.01); *B60W 2710/182* (2013.01)

(58) Field of Classification Search

CPC ............. B60W 10/18; B60W 60/0015; B60W 2556/45; B60W 2710/06; B60W 2710/182

See application file for complete search history.

(56) References Cited

U.S. PATENT DOCUMENTS

| | | | | |
|---|---|---|---|---|
| 9,098,080 | B2 * | 8/2015 | Norris | ............... B60W 60/0053 |
| 2001/0056544 | A1 | 12/2001 | Walker | |
| 2007/0198145 | A1 | 8/2007 | Norris et al. | |
| 2009/0158790 | A1 | 6/2009 | Oliver | |
| 2009/0232668 | A1 | 9/2009 | Sabelstrom | |
| 2010/0125398 | A1 | 5/2010 | Headlee et al. | |
| 2012/0018240 | A1 | 1/2012 | Grubaugh et al. | |
| 2014/0041973 | A1 | 2/2014 | Zula et al. | |
| 2014/0097667 | A1 | 4/2014 | Backes, III | |
| 2016/0139594 | A1 * | 5/2016 | Okumura | ............. B60W 30/00 701/2 |
| 2017/0267221 | A1 * | 9/2017 | Hecker | ................... B60T 7/085 |

| | | | | |
|---|---|---|---|---|
| 2017/0297543 | A1 | 10/2017 | Miura | |
| 2019/0137999 | A1 | 5/2019 | Taguchi et al. | |
| 2019/0202421 | A1 | 7/2019 | Healy | |
| 2020/0110402 | A1 | 4/2020 | Golgiri | |
| 2020/0291608 | A1 | 9/2020 | Ready-Campbell et al. | |
| 2021/0116907 | A1 * | 4/2021 | Altman | ................. B60W 50/04 |
| 2021/0362718 | A1 | 11/2021 | Ikenori | |
| 2022/0128989 | A1 * | 4/2022 | Ghorbanian-Matloob | .................. G05D 1/0038 |
| 2022/0174867 | A1 | 6/2022 | McCutcheon, IV | |
| 2022/0266862 | A1 * | 8/2022 | Bybee | ................... B60W 10/20 |
| 2022/0404827 | A1 | 12/2022 | Hagerskans | |
| 2024/0017701 | A1 * | 1/2024 | van Thiel | ................... B60T 7/12 |
| 2024/0190399 | A1 * | 6/2024 | Gagliano | ................ B60T 15/42 |
| 2024/0190401 | A1 * | 6/2024 | Gagliano | .............. B60T 13/662 |

OTHER PUBLICATIONS

Non-Final Rejection dated Feb. 14, 2025, directed to U.S. Appl. No. 18/062,964; 45 pages.

Notice of Allowance dated Mar. 13, 2025, directed to U.S. Appl. No. 18/062,968; 11 pages.

U.S. Appl. No. 18/062,964, filed Dec. 7, 2022.

U.S. Appl. No. 18/062,942, filed Dec. 7, 2022.

U.S. Appl. No. 18/062,968, filed Dec. 7, 2022.

Non-Final Rejection dated Aug. 21, 2024, directed to U.S. Appl. No. 18/062,942; 13 pages.

Non-Final Rejection dated Sep. 24, 2024, directed to U.S. Appl. No. 18/062,968; 35 pages.

Notice of Allowance dated Apr. 16, 2025, directed to U.S. Appl. No. 18/062,942; 8 pages.

Final Rejection dated Sep. 2, 2025, directed to U.S. Appl. No. 18/062,964; 45 pages.

* cited by examiner

METHOD FOR REMOTE STOP OF A VEHICLE

CROSS-REFERENCE TO RELATED APPLICATIONS

This application is related to U.S. patent application Ser. No. 18/062,964, filed Dec. 7, 2022, U.S. patent application Ser. No. 18/062,942, filed Dec. 7, 2022, and U.S. patent application Ser. No. 18/062,968, filed Dec. 7, 2022, the contents of each of which are incorporated by reference in their entireties.

TECHNICAL FIELD

The present disclosure relates to a remote stop system for a vehicle.

BACKGROUND

Vehicles may be operated autonomous or semi-autonomously. Control systems may be employed to control operation of the vehicle.

BRIEF SUMMARY

According to an embodiment, a remote stop system for a vehicle configured to be operated autonomously or semi-autonomously. The remote stop system includes a mechanical remote stop system configured to apply a first braking force, an electrical remote stop system configured to apply a second braking force, and a remote stop actuator configured to send a wireless control signal to the vehicle. The remote stop actuator has two states: a first state having the remote stop actuator transmitting the wireless control signal to the mechanical remote stop system and the electrical remote stop system and a second state having the remote stop actuator without transmitting the wireless control signal to the mechanical remote stop system and the electrical remote stop system. In the second state, the first braking force and the second braking force are applied simultaneously.

According to an embodiment, a vehicle system includes a vehicle configured to be operated autonomously or semi-autonomously and a remote stop system configured to send a wireless control signal to the vehicle. The remote stop system has a mechanical remote stop system configured to apply a first braking force and an electrical remote stop system configured to apply a second braking force. The remote stop system has two states: a first state having the remote stop actuator transmitting the wireless control signal to the mechanical remote stop system and the electrical remote stop system and a second state having the remote stop actuator without transmitting the wireless control signal to the mechanical remote stop system and the electrical remote stop system. In the second state, the first braking force and the second braking force are applied simultaneously.

According to an embodiment, a method for remotely stopping a vehicle configured to operate autonomously or semi-autonomously includes providing an electromechanical remote stop system, applying a control signal to the vehicle with the electromechanical remote stop system, observing an errant behavior of the vehicle, actuating the electromechanical remote stop system after observing the errant behavior, ceasing applying the control signal based on actuating the electromechanical remote stop system, applying a first braking force due to the ceasing applying the control signal, and applying a second braking force due to the ceasing applying the control signal. Actuating the electromechanical remote stop system, and thus, applying the first braking force and the second braking force, occurs at a location exterior to the vehicle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

The remote stop system of the present disclosure provides a system for stopping an uncontrollable self-driving (e.g., autonomous or semi-autonomous) vehicle. The remote stop system of the present disclosure is an independent emergency stop system that will turn off the vehicle engine and apply brakes in two parallel pathways, bringing the vehicle to a stop when commanded. The remote stop system of the present disclosure removes power from the engine PCIe connection (i.e., Peripheral Component Interconnect Express), causing the vehicle to coast freely. At the same time, the remote stop system of the present disclosure applies brakes by actuating a brake valve and, simultaneously, sends an electrical signal to apply brakes. The parallel brake paths add redundancy to bringing the vehicle to a stop. The remote stop system of the present disclosure is resettable. The remote stop system of the present disclosure employs reliable components that ensure the vehicle system will be brought to a stop when errant behavior is observed.

The remote stop system of the present disclosure is independent of the autonomous vehicles computer systems and control systems. That is, the remote stop system of the present disclosure operates with systems, computers, and components that are not dependent on the operation of the autonomous vehicle. For example, the controllers and computers relied upon to effectuate the remote stop are not the same controllers and computers relied upon to autonomously operate the vehicle. In this manner, the remote stop system is allowed to control stoppage of the vehicle independently of the health status of the vehicle. Therefore, the remote stop system of the present disclosure provides an advantageous safe guard for autonomous vehicles and semi-autonomous vehicles that do not have an operator on board driving the vehicle in order to perform the functions performed by the remote stop system of the present disclosure.

Figure 1:
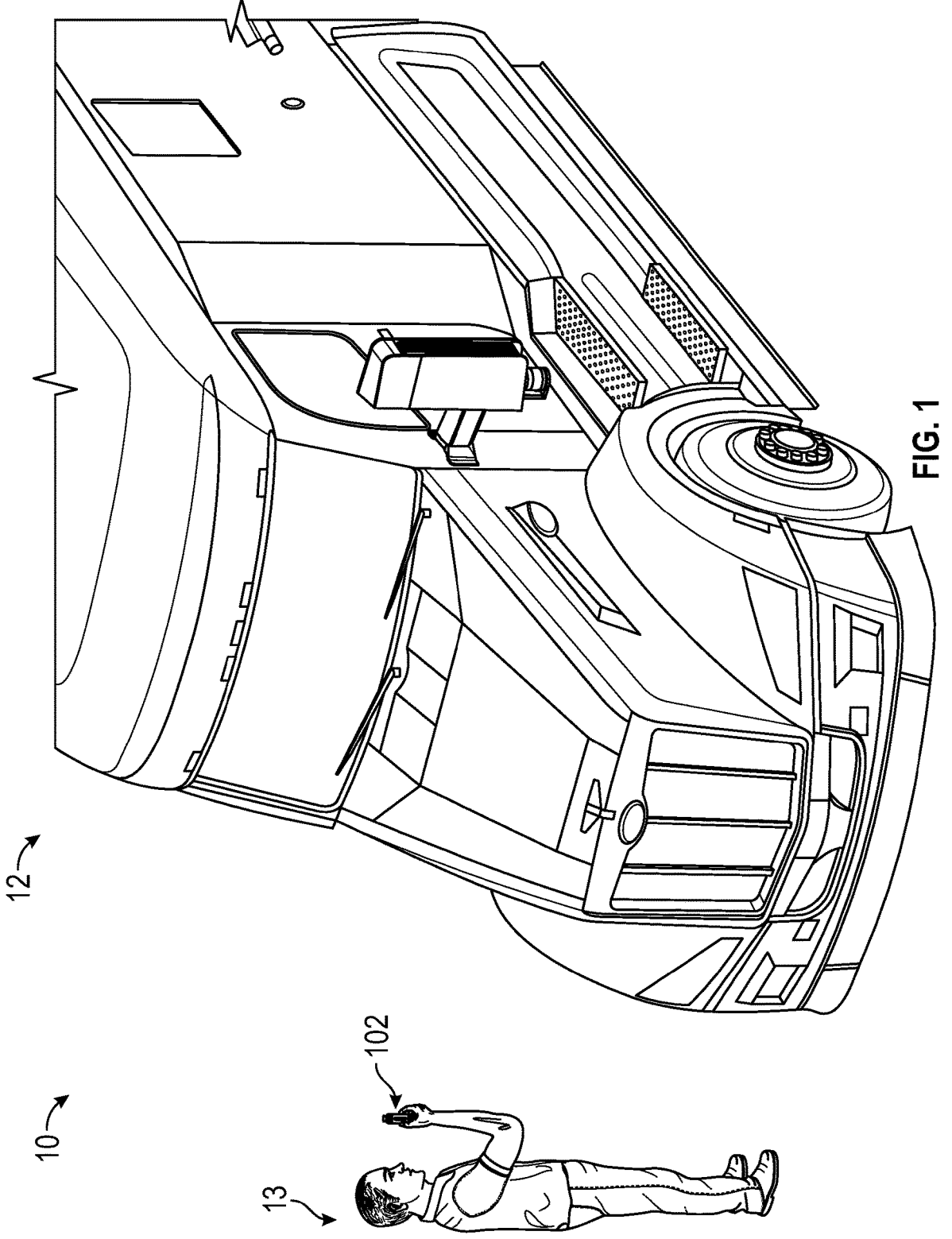
FIG. 1 illustrates a schematic view of a vehicle system having a remote stop system, according to an embodiment of the present disclosure.
Figure 2:
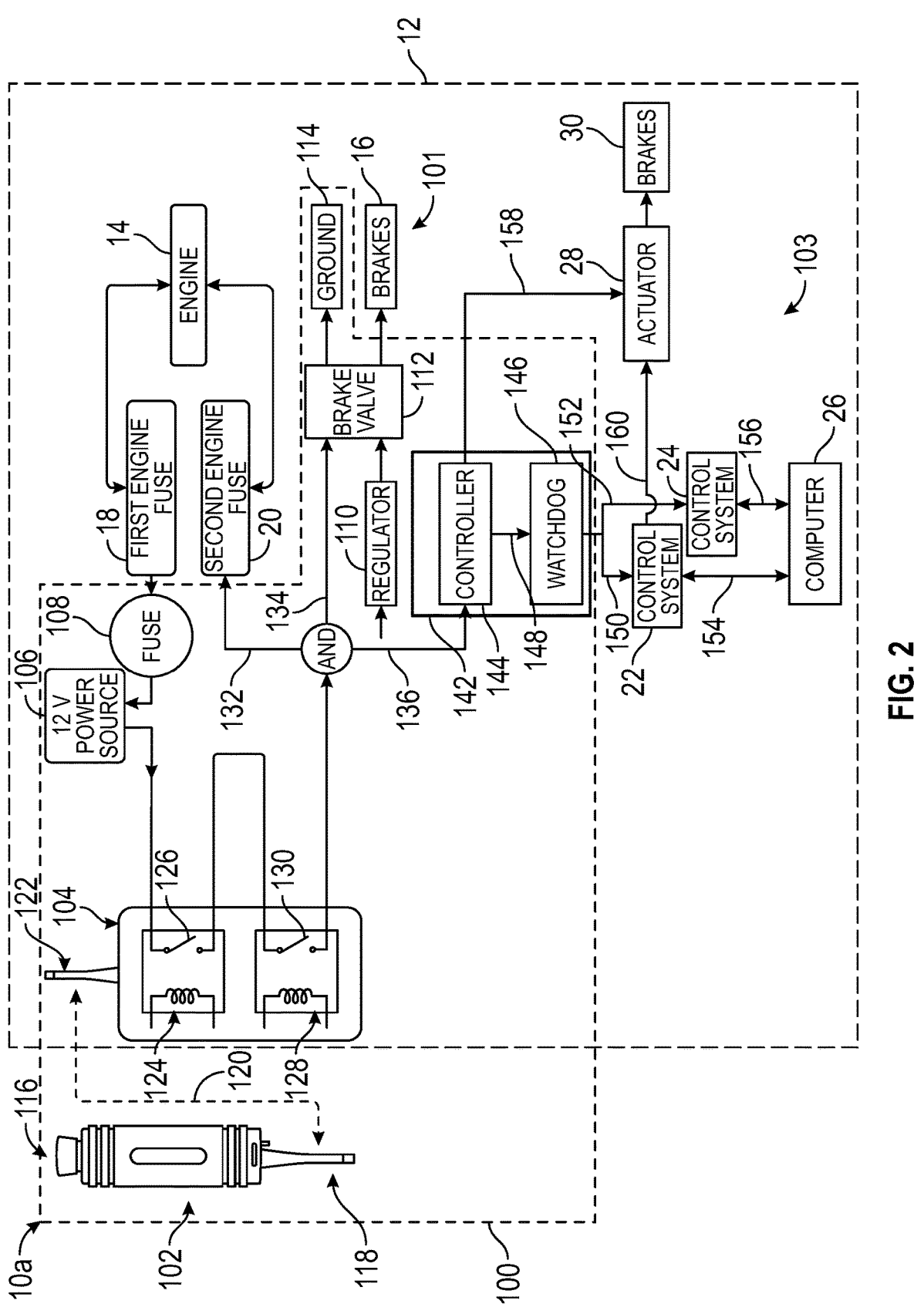
FIG. 2 illustrates a schematic view of a vehicle system having a remote stop system, according to an embodiment of the present disclosure.
Figure 3:
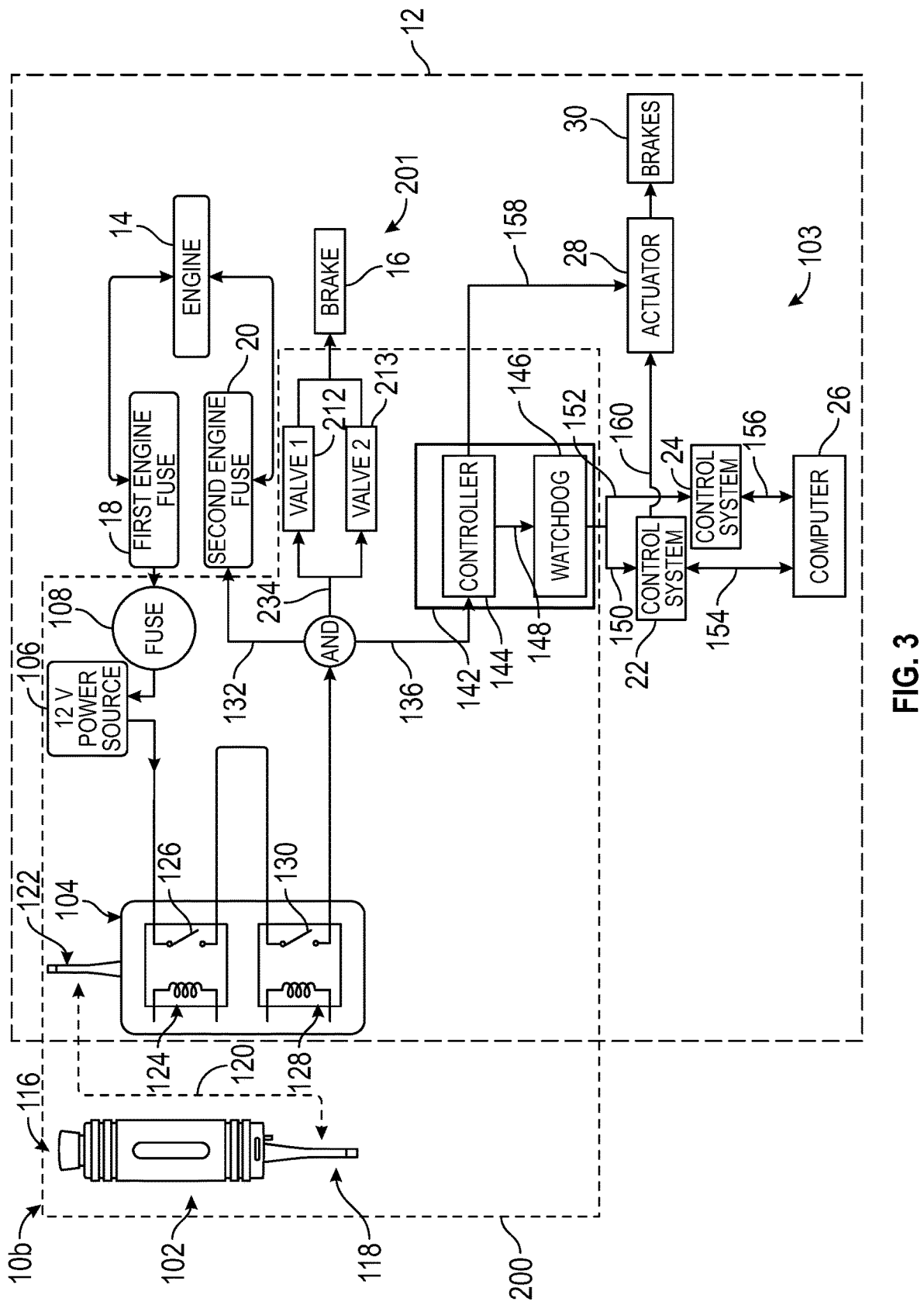
FIG. 3 illustrates a schematic view of a vehicle system having a remote stop system, according to an embodiment of the present disclosure.

The remote stop system of the present disclosure is described in more detail when referring to FIGS. 1 to 3. Referring first to FIG. 1, a vehicle system 10 includes a vehicle 12 having a remote stop actuator 102. The vehicle 12 may be an autonomous or semi-autonomous vehicle. The vehicle 12 may be any autonomous or semi-autonomous motor vehicle, such as, for example, but not limited to a car, a truck, a commercial truck, a semitrailer or semi-truck, a bus, a watercraft, a motorcycle, an aircraft, or a spacecraft. The vehicle 12 is shown schematically in FIG. 2. The remote stop actuator 102 may be part of the remote stop system 100 of FIG. 2 or the remote stop system 200 of FIG. 3.

As shown in FIGS. 1 to 3, the vehicle 12 includes an engine 14, brakes 16, and brakes 30. The brakes 16 may be the parking brakes. That is, the brakes 16 may be the brakes applied when the vehicle 12 is in a stopped and off condition. The brakes 30 may be the foundation brakes. Foundation brakes are those brakes which are operated, usually foot-operated in non-autonomous vehicles, during ordinary driving. The vehicle 12 also includes the brake actuator 28, a first control system 22, a second control system 24, and a vehicle computer 26, all of which effectuate operation of the brakes 30 when the remote stop system 100 is not activated. The engine 14 includes a first engine fuse 18, also referred to as a first power pass-through 18 and a second engine fuse 20, also referred to as a second power pass-through 20. The second fuse 20 may include a PCIe for control of the engine 14. The vehicle 12 is equipped with a portion of the remote stop system 100, as will be described to follow. The remote stop system 100 includes a remote stop actuator 102 and a remote stop controller 104. The remote stop system 100 includes a power source 106 and a fuse 108. The power source 106 may be a 12 volt power input and the fuse 108 may be a 10 Amp fuse. The fuse 108 reduces the power supply from the vehicle 12 main power source to allow the power to be provided to the power source 106 for use in the remote stop system 100.

As described below, the remote stop system includes the ability to halt the engine and to activate the brakes simultaneously. The system to activate the brakes is both mechanical and electrical, including both a mechanical remote stop system 101 and an electrical remote stop system 103. Thus, the remote stop system 100 is an electromechanical remote stop system. An external operator 13 possesses a portion of the remote stop system 100, while the remainder of the remote stop system 100 is located on the vehicle 12. That is, the external operator 13 possess the remote stop actuator 102, while the remote stop controller 104, the power source 106, the fuse 108, the mechanical remote stop system 101, and the electrical remote stop system 103 are located on the vehicle. Accordingly, as described in more detail to follow, the external operator 13 observes the vehicle 12. When it is desired to stop the vehicle 12 (either due to errant behavior or otherwise), the external operator 13 activates the remote stop actuator 102 to remotely stop the vehicle 12.

With continued reference to FIGS. 2 and 3, the remote stop system 100 and the vehicle 12 are shown schematically. As may be appreciated, the features within the dashed vehicle 12 are schematic representations of features installed on the vehicle 12 of FIG. 1. As mentioned, the remote stop system 100 includes the mechanical remote stop system 101 and the electrical remote stop system 103. The mechanical remote stop system 101 includes a pressure regulator 110, a brake valve 112, and a ground 114. The electrical remote stop system 103 includes a brake box 142. The brake box 142 includes a controller 144 and a watchdog 146. The electrical remote stop system 103 includes the first control system 22, the second control system 24, the vehicle computer 26, a brake actuator 28, and brakes 30. The first control system 22, the second control system 24, the vehicle computer 26, the brake actuator 28, and the brakes 30 are existing components of the vehicle 12. That is, the aforementioned components are not installed as a part of the remote stop system 100, but instead are electrically coupled to the remote stop system 100 to allow the remote stop system 100 to control the components. As shown in FIGS. 2 and 3, the mechanical remote stop system 101, the electrical remote stop system 103, the remote stop controller 104, the power source 106, and the fuse 108 are located on the vehicle 12.

With continued reference to FIGS. 2 and 3, the remote stop actuator 102 includes an actuator 116 and a transmitter 118. In some examples, the actuator 116 is a push button. That is, the actuator 116 may be depressed to initiate actuation of the remote stop system 100 and may be released to cease actuation of the remote stop system 100. A push button is just one example, other known actuators are contemplated. The transmitter 118 may transmit a control signal from the remote stop actuator 102 to the remote stop controller 104. The transmission of the control signal from the remote stop actuator 102 to the remote stop controller 104 occurs in the normal operation of the vehicle 12, that is, prior to activation of the remote stop system 100 to stop the vehicle 12. Accordingly, when the actuator 116 is activated, the actuator 116 causes the control signal to cease transmission (e.g., to no longer be emitted from the transmitter 118). For example, the control signal may be established between the remote stop actuator 102 and remote stop controller 104 in a set up phase of the remote stop system 100. Then, if the control signal or link is disconnected or if the actuator 116 is pushed or activated, then the remote stop system 100 will activate to stop the vehicle 12. The control signal may transfer over a wireless connection 120 to the remote stop controller 104. In some examples, the wireless connection 120 is a radiofrequency (RF) connection, though other wireless and wired connections are contemplated, such as, for example, Wi-Fi, Bluetooth® (e.g., short range wireless), etc. The control signal from the remote stop actuator 102 may initiate the remote stop of the vehicle 12.

The wireless connection 120 may allow for the control signal to transmit over a large distance. Accordingly, as the vehicle 12 is operated over a test track, for example, an operator may follow the vehicle 12 while in possession of and/or holding the remote stop actuator 102. When the operator witnesses or observes errant behavior of the vehicle 12 that is outside of predetermined parameters, the operator may actuate the remote stop actuator 102 to send the signal to the remote stop controller 104 onboard the vehicle 12.

The remote stop controller 104 may include a receiver 122 for receiving the control signal from the transmitter 118 of the remote stop actuator 102. The remote stop controller 104 includes a first control circuit 124 having a first switch 126 and a second control circuit 128 having a second switch 130. The first control circuit 124 and the second control circuit 128 are arranged in series such that there is a redundancy in the system. That is, if there is failure of one of the first switch 126 or the second switch 130, remote stop of the vehicle 12 the remote stop system 100 will be activated to stop the vehicle 12. This build in redundancy in the system ensures reliability of the remote stop system 100 by allowing activation of the system (and thus stoppage of the vehicle 12) if any connection is broken within the circuit, regardless of whether an operator initiated the actuator 116. Therefore, more or fewer than two control circuits and two switches is contemplated. When the control signal is received by the receiver 122, the first switch 126 and the second switch 130 are caused to open to detach the first control circuit 124 and the second control circuit 128 from the power source 106, as is described in more detail below.

During operation of the vehicle system 10a, and referring to FIG. 2, the transmitter 118 of the remote stop actuator 102 continuously (e.g., for the entirety of the transmitting period) sends a control signal, across the wireless connection 120, to the receiver 122 of the remote stop controller 104. When the operator 13 desires to remotely stop the vehicle 12, the operator 13 activates the actuator 116 of the remote stop actuator 102 (e.g., depresses the actuator 116). The activation of the actuator 116 causes the control signal to cease to be transmitted from the transmitter 118 from the remote stop actuator 102 to the remote stop controller 104, thus causes the first switch 126 and the second switch 130 to open. When the control signal is ceased to be transmitted, the engine is automatically turned off and the braking actuation is activated. That is, the engine signal 132 ceases causing the engine 14 to stop and/or lose power, the first braking signal 134 ceases causing the brakes 16 to be actuated, and the second braking signal 136 ceases causing the brakes 30 to be actuated. First, the cessation of the engine signal 132 causes the second engine fuse 20 to stop or cut power to the engine 14. This halts the engine 14 and prevents further motion of the vehicle 12. Second, the cessation of the first braking signal 134 causes the brakes 16 to actuate to allow a breaking force to be applied to the vehicle 12. Third, the cessation of the second braking signal 136 performs two functions: 1) actuates the brakes 30 to allow a breaking force to be applied to the vehicle 12 and turns off a main controller (e.g., the first control system 22 and the second control system 24). The brakes 16 and the brakes 30 actively cause the vehicle 12 to stop or cease moving. The cessation of power to the engine 14 and the turning off of the main controller cause the vehicle 12 to coast freely with no further motive power applied. The cessation of the engine stop signal 132, the first braking signal 134, and the second braking signal 136 is simultaneous such that each of the aforementioned actions is initiated simultaneously. There may be some delay in the application of the brakes 16 due to the need to actuate the valves, however, the delay is minimal and each action, as mentioned, is initiated simultaneously.

Activation of the brakes 16 of the mechanical remote stop system 101 is now explained. The brake valve 112 is in a normally closed condition. That is, during operation of the vehicle 12 and when the remote stop system 100 is not actuated, the brake valve 112 is closed. Upon activation of the remote stop system 100 (and thus the mechanical remote stop system 101), the cessation of the first braking signal 134 causes the brake valve 112 to open. With the brake valve 112 open, air pressure from the vehicle 12 flows through the brake valve 112 and to the brakes 16 to apply a braking force to the vehicle 12. The pressure regulator 110 is fluidly coupled in line with and upstream of the brake valve 112 such that the air pressure flows through the pressure regulator 110 prior to flowing through the brake valve 112 to the brakes 16. The pressure regulator 110 reduces the air pressure prior to reaching the brakes 16 thus reducing the braking force the brakes 16 apply when the remote stop system 100 is activated. In some examples, a pressure gauge (not shown) may be coupled in line with the brake valve 112 to measure the pressure of the air flowing to the brakes 16. The pressure gauge is optional and may be omitted.

Accordingly, the braking force applied by the brakes 16 to the vehicle 12 are controlled in the following manner. First, before using the remote stop system 100, the pressure regulator 110 is set to allow a predetermined amount of pressure to the brake valve 112. When the remote stop system 100 is activated, the first braking signal 134 ceases being sent and the brake valve 112 actuates and releases pressure downstream to the brakes 16. The pressure that flows past the pressure gauge will help determine how much braking force has been applied. The pressure regulator 110 can thus be adjusted, based on the pressure gauge readings, to allow more or less pressure through the system, increasing or decreasing the braking force as needed. For example, based on the particular vehicle 12 in which the remote stop system 100 is installed, the pressure regulator 110 may be adjusted to allow more or less braking force to accommodate the size and/or weight of the vehicle 12. This allows the pressure to be tuned to a predetermined pressure based on a particular vehicle.

The brakes 16 will stop the vehicle 12 by themselves, but to build in a redundant system, the remote stop system 100 also includes the electrical remote stop system 103 that relies on the brake box 142 and brakes 30 to also stop the vehicle 12. During the normal course of vehicle operation (e.g., without the use of the remote stop system 100), the main controller (e.g., the first control system 22 and the second control system 24) applies braking control to the braking actuator 28 and brakes 30 via an operational braking signal 160. When the remote stop system 100 is activated, the second braking signal 136 ceases to be transmitted to the brake box 142. This causes the brake box 142 to turn off the first control system 22 and the second control system 24. The brake box 142 turns off the first control system 22 and the second control system 24 via a heartbeat message, to be explained in more detail below. Once the first control system 22 and the second control system 24 are turned off, the brake box 142 sends a separate brake command (e.g., bypass braking signal 158) to the brake actuator 28. The brake actuator 28 then actuates the brakes 30 to apply a braking force to the vehicle 12. The control signals sent via the operational braking signal 160 and the bypass braking signal 158 may be CAN (controller area network) messages.

As mentioned, the brake box 142 turns off the first control system 22 and the second control system 24 via a heartbeat message. The heartbeat message is sent from the controller 144 to the watchdog 146 via communication line 148 to each of the first control system 22 and the second control system 24 via the communication line 150 and the communication line 152, respectively. The heartbeat message instructs the first control system 22 and the second control system 24 to turn off. This bypasses the vehicle computer 26 such that the vehicle computer 26 no longer sends the braking signal over communication line 154 and communication line 156 to the actuator 28. Instead, with the first control system 22 and the second control system 24 turned off, the braking signal is received at the actuator 28 from the controller 144.

Collectively, stopping the engine 14, applying the brakes 16, and applying the brakes 30 stops the vehicle 12. Once the vehicle 12 has come to a stop, the actuator 116 is returned to the unactuated position (e.g., by actively raising/twisting the actuator and/or by no longer depressing the actuator, etc.). In the unactuated position, the control signal once again is transmitted from the remote stop actuator 102 to the remote stop controller 104. The first switch 126 and the second switch 130 are caused to close, reconnecting the remote devices (e.g., the remote stop actuator 102 and the remote stop controller 104) via the control signal. As the control signal is now emitted once again from the remote stop actuator 102, the engine 14 may be turned back on (e.g., by an operator or by a remote control) and the brakes 16 and the brakes 40 may be actuated in a normal operating fashion. In other words, when the actuator 116 is rest (e.g., moved from a depressed position to an undepressed position), the signal connection, which was previously severed during actuation of the actuator 116, between the remote stop actuator 102 and the remote stop controller 104 is reestablished allowing for normal operation of the vehicle 12. With the signal now applied to the brake valve 112, the brake valve 112 closes and the air pressure no longer travels to the brakes 16, thus ceasing the braking action of brakes 16. Additionally, the brake box 142 no longer sends the heartbeat signal to the first control system 22 and the second control system 24 and no longer sends the braking signal 158 to the brake actuator 28. This ceases the braking action of brakes 30 and also allows for the operational braking signal 160 to once again be sent from the first control system 22 and the second control system 24 to allow normal braking function during operation of the vehicle 12. To restart the engine 14, an operator (which may be the operator 13 of FIG. 1 or other operator) restarts the engine 14 or the vehicle 12 according to normal operation of the vehicle 12. In some examples, this results in the operator entering the driver side of the vehicle 12 to start the engine. In some examples, restarting the vehicle 12 is performed remotely. The remote stop system 100 may be actuated multiple times as required to stop the vehicle 12. Thus, the process is repeatable as needed by an operator.

Stated another way, when the actuator 116 is activated, the remote stop system 100 removes power from the engine PCIe connection (e.g., via the second engine fuse 20), causing the vehicle 12 to coast freely. At the same time, the remote stop system 100 applies brakes in two ways. First, the mechanical remote stop system 101 actuates a brake valve 112, which releases pneumatic pressure causing the brakes 16 to activate. Second, the electrical remote stop system 103 sends an electronic brake message (e.g., bypass braking signal 158) to the brake controller unit, e.g., brake actuator 28. The electronic brake message is only sent when the remote stop system 100 is triggered by the remote stop actuator 102. By relying on a heartbeat signal from the brake box 142, the main controller units, e.g., the first control system 22 and the second control system 24, will also turn off when the remote stop is triggered so the electronic messages do not clash from two sources (e.g., from the vehicle computer 26 and from the brake box 142).

FIG. 3 illustrates another exemplary remote stop system 200 for a vehicle system 10*b*. The remote stop system 200 operates the same as described with respect to FIGS. 1 and 2, except the mechanical remote stop system 101 is replaced with a mechanical remote stop system 201. The mechanical remote stop system 201 includes a first valve 212 and a second valve 213. The first valve 212 and the second valve 213 are in a normally closed position during operation of the vehicle 12 when the remote stop system 200 is not actuated. When the first braking signal 234 is no longer transmitted from the remote stop controller 104, the mechanical remote stop system 201 applies power to the first valve 212 and the second valve 213, thus openings the valves. With the first valve 212 and the second valve 213 open, pressurized air from filled tanks is permitted to flow through the first valve 212 and the second valve 213 to apply braking force to the brakes 30, thus stopping the vehicle 12. There is a delay in braking with the brakes 30 as the tanks are depleted. Thus, when the actuator 116 is pressed, the valves open to release pneumatic pressure to apply the brake 30.

As may be appreciated, when the mechanical remote stop system 201 is installed on the vehicle 12, the pressure tanks that provide the pressurized air needs to be filed and the first valve 212 and the second valve 213 subsequently closed. The tanks are thus either filled when installed or are installed already prefilled. To reset the system, the tanks need to be refilled and the first valve 212 and the second valve 213 again closed.

Figure 4:
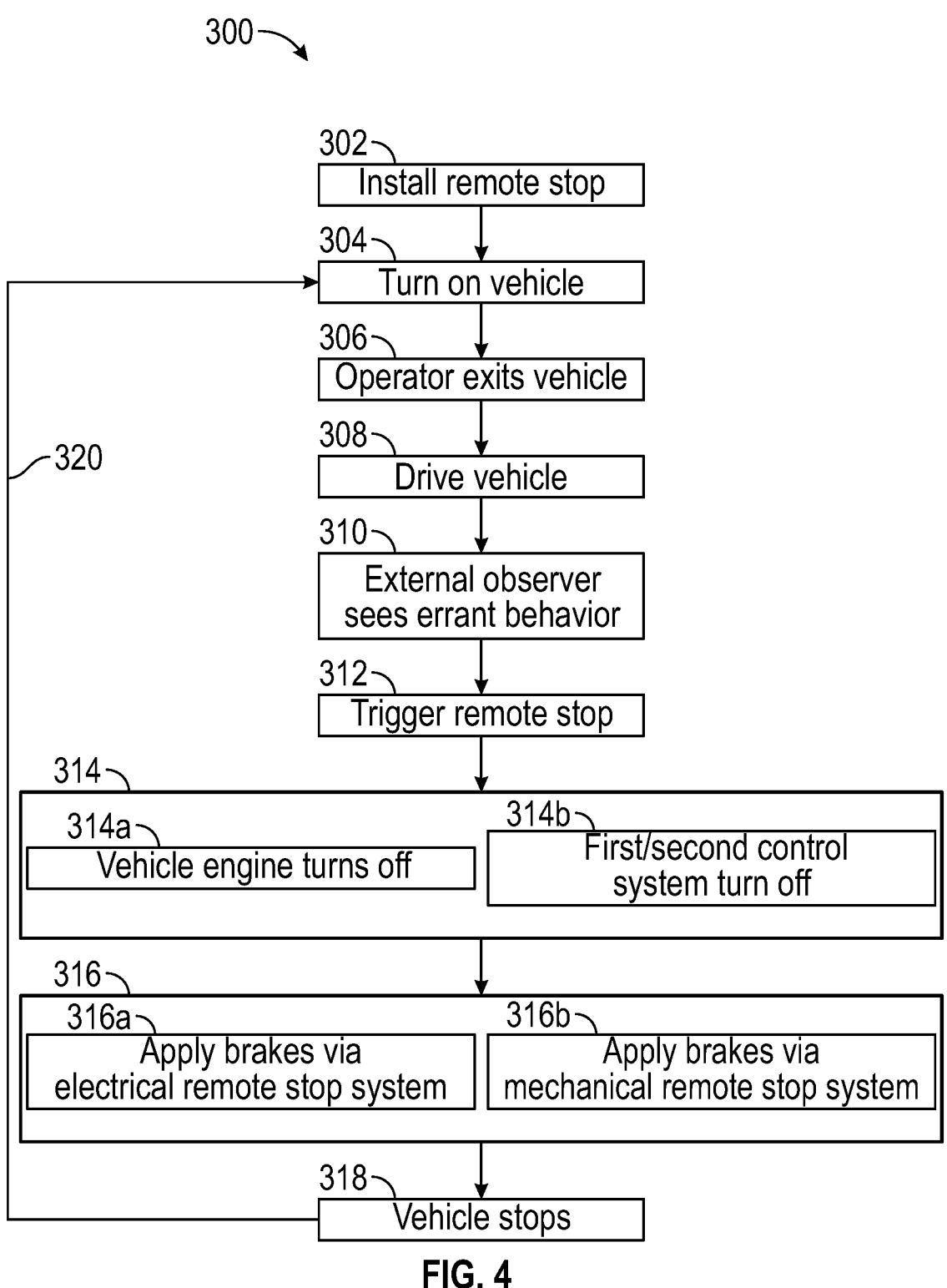
FIG. 4 illustrates a method for stopping a vehicle with a remote stop system, according to an embodiment of the present disclosure.

Referring to FIG. 4, a method 300 for remote stop of a vehicle 12 is shown. In step 302, the remote stop system (e.g., remote stop system 100 or remote stop system 200) is installed on the vehicle 12. This includes installation of all the parts identified in FIG. 1 or 2 as belonging to the remote stop system. Once installed, at step 304, the vehicle 12 is turned on, that is, the engine is started. The vehicle 12 may be started in accordance with the normal function and operation of the vehicle 12, whether that be remote start or an operator starting the vehicle 12. If the vehicle 12 is an autonomous or semi-autonomous vehicle, at step 306, the operator may exit the vehicle 12. Although described herein in the context of autonomous or semi-autonomous vehicles, the vehicle 12 could be a human operated vehicle enabled with the remote stop system 100 such that another operator could remotely stop the vehicle, even with the human in the vehicle 12.

At step 308, the vehicle 12 is operated. As mentioned, this may be autonomous or semi-autonomous operation. In some examples, the operation is conducted as testing of the vehicle 12 and the remote stop system provides a security measure during the testing of the vehicle 12. At step 310, an operator that is external to the vehicle 12 observes the operation of the vehicle 12. The operator may observe errant behavior in the vehicle 12. Errant behavior may include, but is not limited to failure of onboard control systems, the vehicle begins to make an unsafe decision, the vehicle is drifting from a desired line or desired path, an internal fault that may trigger a hazard light, etc. Once the errant behavior is detected by the external operator, the external operator may activate the actuator 116 of the remote stop actuator 102 at step 312. At step 314, the remote stop actuator 102 then ceases transmission of the control signal to, simultaneously, turn the vehicle engine off (e.g., step 314*a*) and turn the first control system and the second control system off (e.g., step, 314*b*) as described previously. Step 314*b* initiates step 316, which is the application of brakes via the electrical remote stop system (e.g., step 316*a*) and via the mechanical remote stop system (e.g., step 316*b*). The vehicle 12 then comes to a complete stop at step 318. As mentioned previously, the engine may be turned back on and the braking force removed such that the process is repeatable. This is shown via line 320, which illustrates that after the vehicle stops at step 318, the vehicle 12 may be turned on at step 304 and the process repeated.

As described in FIG. 4, to add redundancy to the system, two parallel actions cause the vehicle to coast. First, at 314*a*, the vehicles engine power is removed and, second, at 314*b*, the main controller is turned off. Similarly, two parallel actions cause the vehicle to brake. First, at 316*a*, the main brakes (e.g., brakes 30) are applied via the CAN message and, second, at 316*b*, the brakes (e.g., brakes 16) are applied by releasing the valve (either the brake valve 112 or the valves 212 and 213). Such redundancy ensures increased reliability in cause the vehicle to come to a stop, keeping external property and persons safe.

Accordingly, once the remote stop system (e.g., remote stop system 100 or remote stop system 200) is installed, an external observer can bring the vehicle 12 to a stop at any time. Although described with respect to errant behavior, the external observer has the ability to stop the vehicle 12 at any time with actuation of the remote stop actuator 102. As discussed previously, the remote stop system removes power from the engine, causing the vehicle 12 to coast, while also applying brakes 16 and brakes 30 instantaneously. The vehicle 12 will come to a stop, keeping external operators and property safe.

In some cases, the remote stop system (e.g., remote stop system 100 or remote stop system 200) may not be a permanent installation on the vehicle 12. For example, when the vehicle 12 is being tested prior to road use, the remote stop system may be installed on the vehicle 12 to provide a safe guard against errant behavior detected during testing, that will be fixed or adjusted prior to road use. Thus, once the testing is completed, the remote stop system may be removed or uninstalled from the vehicle 12. This includes removal of each component associated with the remote stop system.

The external operator, as described herein, may be a human operator, a robotic operator, a watchdog for monitoring vehicle performance, etc. The external operator is any operator that is capable of 1) detecting errant behavior in the vehicle and 2) activating the remote stop system to stop the vehicle.

In order to ensure proper function of the remote stop system and ensure function even during failure or malfunction of vehicle systems (e.g., the vehicle computers), the remote stop system is operated wholly separate from the autonomous operation system of the vehicle. That is, the systems and controls that enable the control signal to transmit from the remote stop actuator to the brakes and engine computer are not the systems and controls that vehicle relies on for autonomous or semi-autonomous operation of the vehicle. Separation of the remote control system and the vehicle control system allow for the vehicle to be remotely stopped even in conditions where the vehicle control system is inoperable or is malfunctioning (e.g., where the errant behavior is caused by the vehicle control system).

Figure 5:
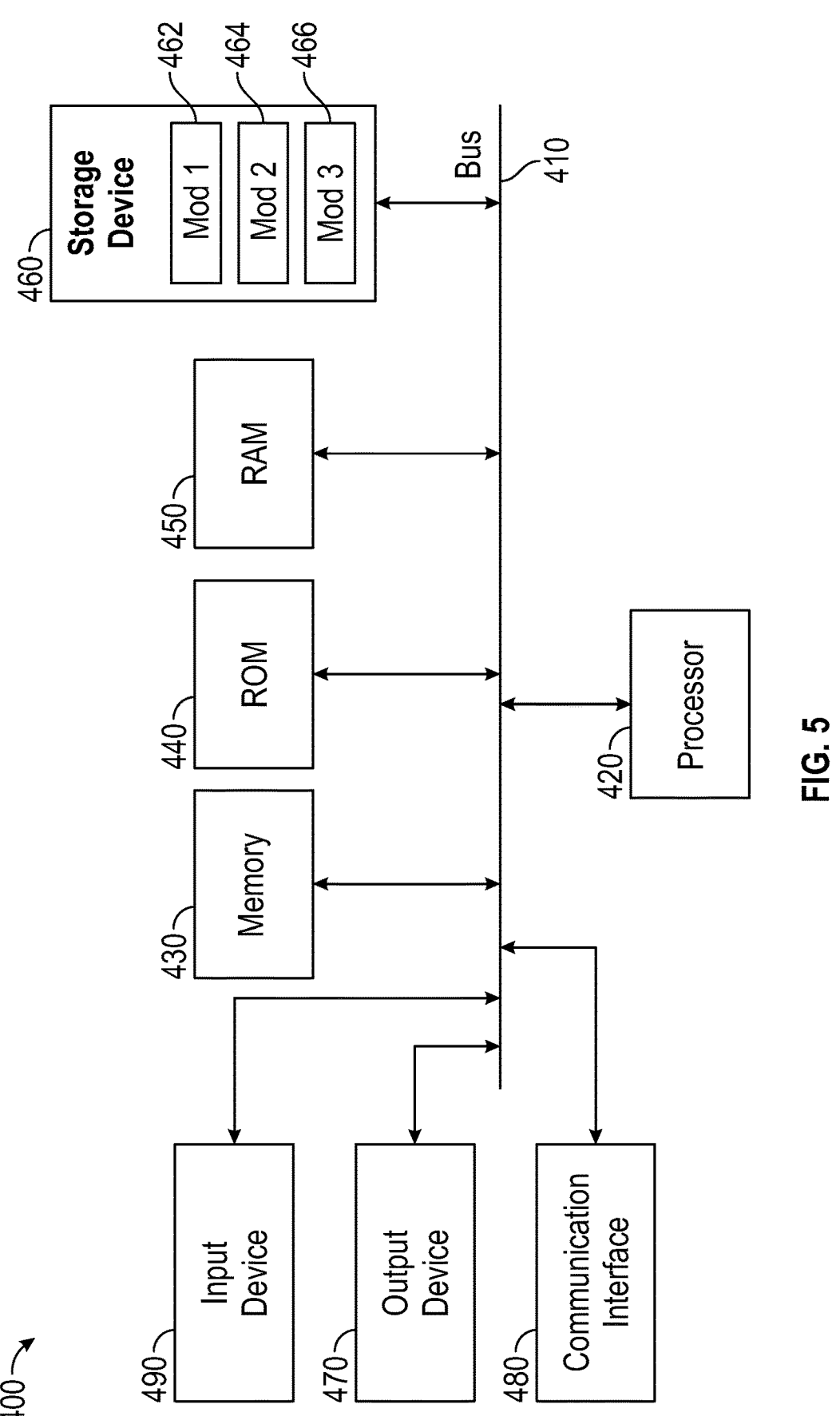
FIG. 5 illustrates a computer system, according to an embodiment of the present disclosure.

In order to effectuate the controls previously described the computers and/or controllers of FIGS. 1 to 4 may be computers as described with respect to FIG. 5. With reference to FIG. 5, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The computing device 400 can include a cache of high-speed memory connected directly with, in close proximity to, or integrated as part of the processor 420. The computing device 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general-purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, system bus 410, output device 470, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art, such as, for example, a display. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

According to an aspect of the present disclosure, a remote stop system for a vehicle configured to be operated autonomously or semi-autonomously includes a mechanical remote stop system configured to apply a first braking force, an electrical remote stop system configured to apply a second braking force, and a remote stop actuator configured to send a wireless control signal to the vehicle. The remote stop actuator having two states: a first state having the remote stop actuator transmitting the wireless control signal to the mechanical remote stop system and the electrical remote stop system and a second state having the remote stop actuator without transmitting the wireless control signal to the mechanical remote stop system and the electrical remote stop system. In the second state, the first braking force and the second braking force are applied simultaneously.

The remote stop system of the preceding clause, the remote stop actuator further including an actuator configured to be activated by an external operator and a transmitter configured to transmit the wireless control signal.

The remote stop system of any preceding clause, wherein, in the second state, an engine of the vehicle is automatically stopped simultaneously with applying the first braking force and the second braking force.

The remote stop system of any preceding clause, further including a remote stop controller configured to receive the wireless control signal from the remote stop actuator and transmit the wireless control signal to the mechanical remote stop system and the electrical remote stop system.

The remote stop system of any preceding clause, further including a remote stop controller having a pair of redundant circuits configured to selectively transmit the wireless control signal to the vehicle.

The remote stop system of any preceding clause, wherein, in the first state, the pair of redundant circuits are closed, and, in the second state, at least one circuit of the pair of redundant circuits is open.

The remote stop system of any preceding clause, further including a power source and a switch, wherein the power source is configured to close the switch to permit transmission of the wireless control signal to the vehicle.

The remote stop system of any preceding clause, the mechanical remote stop system further including a brake valve configured to selectively apply the first braking force to the vehicle.

The remote stop system of any preceding clause, the brake valve including an open position and a closed position, wherein the brake valve is in the closed position during operation of the vehicle and in the open position to apply the first braking force to the vehicle.

The remote stop system of any preceding clause, wherein the brake valve is configured to move from a closed position to an open position when the remote stop actuator is in the second state.

The remote stop system of any preceding clause, further including a pressure regulator configured to regulate the first braking force.

The remote stop system of any preceding clause, further including a pressure gauge configured to monitor a pressure through the brake valve.

The remote stop system of any preceding clause, wherein the brake valve includes a first valve and a second valve.

The remote stop system of any preceding clause, the electrical remote stop system including a brake box configured to override a main controller of the second braking force.

The remote stop system of any preceding clause, wherein, during an override condition, the brake box applies the second braking force and prohibits the main controller from applying the second braking force.

According to an aspect of the present disclosure, a vehicle system includes a vehicle configured to be operated autonomously or semi-autonomously and a remote stop system configured to send a wireless control signal to the vehicle. The remote stop system has a mechanical remote stop system configured to apply a first braking force and an electrical remote stop system configured to apply a second braking force. The remote stop system has two states: a first state having the remote stop actuator transmitting the wireless control signal to the mechanical remote stop system and the electrical remote stop system and a second state having the remote stop actuator without transmitting the wireless control signal to the mechanical remote stop system and the electrical remote stop system. In the second state, the first braking force and the second braking force are applied simultaneously.

The vehicle system of the preceding clause, further including a remote stop actuator configured to send the wireless control signal.

The vehicle system of any preceding clause, further including a remote stop controller configured to receive the wireless control signal from the remote stop actuator and transmit the wireless control signal to mechanical remote stop system and the electrical remote stop system.

The vehicle system of any preceding clause, the remote stop actuator further including an actuator configured to be activated by an external operator and a transmitter configured to transmit the wireless control signal.

The vehicle system of any preceding clause, further including a remote stop controller having a pair of redundant circuits configured to selectively transmit the wireless control signal to the vehicle.

The vehicle system of any preceding clause, further including a power source and a switch, wherein the power source is configured to close the switch to permit transmission of the wireless control signal to the vehicle.

The vehicle system of any preceding clause, further including two or more switches, and wherein only a single switch of the two or more switches is required to be open to stop transmission of the wireless control signal to the vehicle.

The vehicle system of any preceding clause, the mechanical remote stop system further including a brake valve configured to selectively apply the first braking force to the vehicle.

The vehicle system of any preceding clause, the brake valve including an open position and a closed position, wherein the brake valve is in the closed position during operation of the vehicle and in the open position to apply the first braking force to the vehicle.

The vehicle system of any preceding clause, further including a pressure regulator configured to regulate the first braking force.

The vehicle system of any preceding clause, further including a pressure gauge configured to monitor a pressure through the brake valve.

The vehicle system of any preceding clause, wherein the brake valve includes a first valve and a second valve.

The vehicle system of any preceding clause, the electrical remote stop system including a brake box configured to override a main controller of the second braking force.

The vehicle system of any preceding clause, wherein, during an override condition, the brake box applies the second braking force and prohibits the main controller from applying the second braking force.

According to an aspect of the present disclosure a method for remotely stopping a vehicle configured to operate autonomously or semi-autonomously includes providing an electromechanical remote stop system, applying a control signal to the vehicle with the electromechanical remote stop system, observing an errant behavior of the vehicle, actuating the electromechanical remote stop system after observing the errant behavior, ceasing applying the control signal based on actuating the electromechanical remote stop system, applying a first braking force due to the ceasing applying the control signal, and applying a second braking force due to the ceasing applying the control signal. Actuating the electromechanical remote stop system, and thus, applying the first braking force and the second braking force, occurs at a location exterior to the vehicle.

The method of the preceding clause, wherein providing the electromechanical remote stop system further includes providing a mechanical remote stop system configured to apply the first braking force and an electrical remote stop system configured to apply the second braking force.

The method of any preceding clause, wherein providing the electromechanical remote stop system further includes installing a remote stop controller, a brake valve, and a brake box on the vehicle.

The method of any preceding clause, wherein observing errant behavior of the vehicle occurs at a location exterior to the vehicle.

The method of any preceding clause, further including operating the vehicle in an autonomous or semi-autonomous mode before and during observing the errant behavior, wherein actuating the electromechanical remote stop system stops the autonomous or semi-autonomous operating of the vehicle.

The method of any preceding clause, wherein errant behavior includes one or more of i) failure of onboard control systems, ii) the vehicle begins to make an unsafe decision, iii) the vehicle is drifting from a desired line or desired path, or iv) an internal fault that triggers a hazard light.

The method of any preceding clause, further including ceasing engine operation.

The method of any preceding clause, wherein ceasing engine operation occurs simultaneously with applying the first braking force and the second braking force.

The method of any preceding clause, wherein ceasing applying the control signal operates stops the engine of the vehicle.

The method of any preceding clause, wherein ceasing applying the control signal operates the first braking force and the second braking force.

The method of any preceding clause, further including, resetting the method after the vehicle stops to allow subsequent actuations of the electromechanical remote stop system.

The method of any preceding clause, wherein resetting the method includes reestablishing transmission of the control signal from the remote stop system to the vehicle and starting the engine.

The method of any preceding clause, wherein actuating the electromechanical remote stop system occurs multiple times.

The method of any preceding clause, further including opening a brake valve to apply the first braking force to the vehicle.

The method of any preceding clause, further including reducing an air pressure through the brake valve.

The method of any preceding clause, further including monitoring an air pressure through the brake valve.

The method of any preceding clause, wherein the brake valve includes a first brake valve and a second brake valve.

The method of any preceding clause, further including providing a brake box to override a main controller of the second braking force.

The method of any preceding clause, wherein, during the override, the electromechanical remote stop system applies the second braking force and prohibits a main controller from applying the second braking force.

The method of any preceding clause, wherein the control signal is transmitted continuously during the applying step.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A method for remotely stopping a vehicle configured to operate autonomously or semi-autonomously comprising:

providing an electromechanical remote stop system;

applying a control signal to the vehicle with the electromechanical remote stop system;

observing an errant behavior of the vehicle;

actuating the electromechanical remote stop system after observing the errant behavior;

ceasing applying the control signal based on actuating the electromechanical remote stop system, wherein ceasing applying the control signal stops an engine of the vehicle;

applying a first braking force due to the ceasing applying the control signal; and applying a second braking force due to the ceasing applying the control signal, wherein actuating the electromechanical remote stop system, and thus, applying the first braking force and the second braking force, occurs at a location exterior to the vehicle.

2. The method of claim 1, wherein providing the electromechanical remote stop system further comprises providing a mechanical remote stop system configured to apply the first braking force and an electrical remote stop system configured to apply the second braking force.

3. The method of claim 1, wherein providing the electromechanical remote stop system further comprises installing a remote stop controller, a brake valve, and a brake box on the vehicle.

4. The method of claim 1, wherein observing errant behavior of the vehicle occurs at a location exterior to the vehicle.

5. The method of claim 1, further comprising operating the vehicle in an autonomous or semi-autonomous mode before and during observing the errant behavior, wherein actuating the electromechanical remote stop system stops the autonomous or semi-autonomous operating of the vehicle.

6. The method of claim 1, wherein errant behavior comprises one or more of i) failure of onboard control systems, ii) the vehicle begins to make an unsafe decision, iii) the vehicle is drifting from a desired line or desired path, or iv) an internal fault that triggers a hazard light.

7. The method of claim 1, further comprising ceasing engine operation.

8. The method of claim 7, wherein ceasing engine operation occurs simultaneously with applying the first braking force and the second braking force.

9. The method of claim 1, wherein ceasing applying the control signal operates the first braking force and the second braking force.

10. The method of claim 1, further comprising, resetting the method after the vehicle stops to allow subsequent actuations of the electromechanical remote stop system.

11. The method of claim 10, wherein resetting the method comprises:

reestablishing transmission of the control signal from the remote stop system to the vehicle; and starting the engine.

12. The method of claim 1, wherein actuating the electromechanical remote stop system occurs multiple times.

13. The method of claim 1, further comprising opening a brake valve to apply the first braking force to the vehicle.

14. The method of claim 13, further comprising reducing an air pressure through the brake valve.

15. The method of claim 13, further comprising monitoring an air pressure through the brake valve.

16. The method of claim 13, wherein the brake valve includes a first brake valve and a second brake valve.

17. The method of claim 1, further comprising providing a brake box to override a main controller of the second braking force.

18. The method of claim 17, wherein, during the override, the electromechanical remote stop system applies the second braking force and prohibits a main controller from applying the second braking force.

19. The method of claim 1, wherein the control signal is transmitted continuously during the applying step.

20. The method of claim 1, further comprising preventing the electromechanical remote stop system from stopping the vehicle when the control signal is applied.

* * * * *